United States Patent
Aura et al.

(10) Patent No.: US 6,569,247 B1
(45) Date of Patent: May 27, 2003

(54) ARRANGEMENT IN CONNECTION WITH FIBRE COATING LINE

(75) Inventors: Kimmo Aura, Vantaa (FI); Jukka Hillberg, Järvenpää (FI); Simo Kekkonen, Klaukkala (FI); Pauli Kettunen, Martinkylä (FI); Paavo Veijanen, Helsinki (FI)

(73) Assignee: Nextrom Holding S.A., Ecublens (CH)

( * ) Notice: Subject to any disclaimer, the term of this patent is extended or adjusted under 35 U.S.C. 154(b) by 0 days.

(21) Appl. No.: 09/646,016

(22) PCT Filed: Mar. 24, 1999

(86) PCT No.: PCT/FI99/00240
§ 371 (c)(1),
(2), (4) Date: Oct. 4, 2000

(87) PCT Pub. No.: WO99/48829
PCT Pub. Date: Sep. 30, 1999

(30) Foreign Application Priority Data

Mar. 26, 1998 (FI) .................................................. 980681

(51) Int. Cl.[7] .................................................. B05C 3/12
(52) U.S. Cl. ........................ 118/420; 118/67; 118/125
(58) Field of Search ............................. 226/174; 57/90; 118/125, 410, 419, 420, 67, 68, 69; 425/71, 113, 114

(56) References Cited

U.S. PATENT DOCUMENTS

| 4,127,370 A | 11/1978 | Jackson |
| 5,372,757 A | 12/1994 | Schneider |
| 5,676,892 A | 10/1997 | Kertscher |

FOREIGN PATENT DOCUMENTS

| EP | 0 424 150 A2 | 4/1991 |
| EP | 0 443 701 A2 | 8/1991 |

Primary Examiner—Brenda A. Lamb
(74) Attorney, Agent, or Firm—Oliff & Berridge, PLC

(57) ABSTRACT

The invention relates to an arrangement in connection with a fibre coating line which comprises a fibre payout device (1) from which fibres are arranged to be guided to a press (2) for forming a coating round the fibres, a cooling device (3) for cooling a conductor formed by the coating and the fibres, a pulling device (4) by means of which the conductor formed by the coating and the fibres is pulled further from the press (2), and means for guiding the conductor to the next processing stage after cooling, whereby the pulling device (4) is arranged above the height of the line so as to enable the lowest point of the pulling device (4) to be substantially at the height of the line. To facilitate the start-up of the line, the pulling device (4) is arranged to be uplifted entirely above the height of the line substantially in a vertical direction.

10 Claims, 2 Drawing Sheets

ARRANGEMENT IN CONNECTION WITH FIBRE COATING LINE

Figure 1:
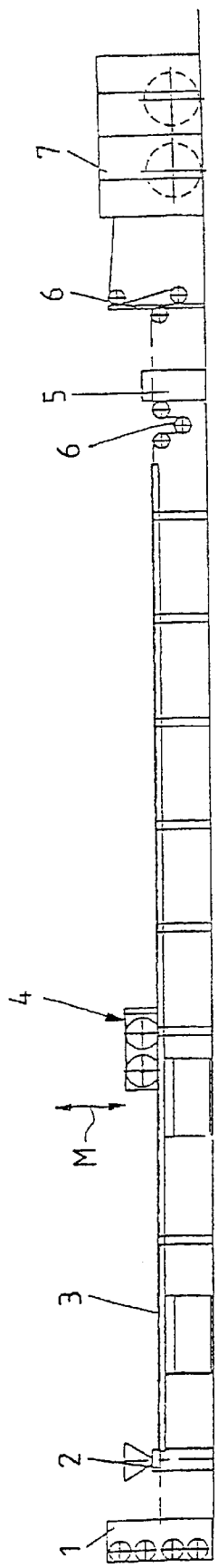

The invention relates to an arrangement in connection with a coating line which comprises a fibre payout device from which fibres are arranged to be guided to a press for forming a coating round the fibres, a cooling device for cooling a conductor formed by the coating and the fibres, a pulling device by means of which the conductor formed by the coating and the fibres is pulled further from the press, and means for guiding the conductor to the next processing stage after the cooling, whereby the pulling device is arranged above the height of the line so as to enable the lowest point of the pulling device to be substantially at the height of the line.

In fibre cable production, a common requirement at present is that excess fibre lengths can be kept to the minimum. A common principle in the field is that a desired excess fibre length is produced by winding a conductor formed by a sheath and a fibre or fibres round a wheel of a determined diameter, whereby the fibres are pressed against the inner surface of the sheath, and a negative excess fibre length is formed between the sheath and the fibres. At the next processing stages, the sheath contracts as a result from the cooling, whereby a final, usually positive excess fibre length with respect to the sheath can be achieved for the fibres.

At present, arrangements of this kind are widely known in connection with secondary coating lines of optic cables, for example. In the field, it is known to use a wheel drive device or a belt drive device as a pulling device. U.S. Pat. No. 4,893,998 and EP publications 0 286 819 and 0 275 994 disclose solutions which can be given as examples of known solutions in the field. In these solutions, the pulling device is positioned below the fibre line and mounted to be a fixed part of the production line.

In a common one-wheel pulling device, a product paid out from a press must be wound round a pulling wheel once or twice, and therefore the product must be deviated from the wire line by appropriate controllers. The controllers, however, generate friction and scratch the surface of the sheath. The friction generated by the controllers leads to the fact that line rates cannot be increased since an increase in the rate increases the frictional forces too much. To place the pulling device below the fibre line is usually also technically difficult and a structure fixedly mounted in the line makes the start-up of the line more difficult since the product paid out from the press must be passed via the pulling device. The fixedly positioned structure in the line restricts the adaptation of the production line for different processes.

Solutions in which the pulling device is positioned above the fibre line have been provided for eliminating the problems described above. EP publication 0 443 701 discloses a structure which exemplifies such a solution. However, the disadvantages presented by this known structure include all the above drawbacks of the one-wheel pulling device. Furthermore, a further drawback also presented by this solution is the difficult stage at which the product is passed via the pulling device during the start-up of the line.

An object of the invention is to provide an arrangement by means of which the disadvantages of the prior art can be eliminated. This is achieved by the arrangement of the invention, which is characterized in that the pulling device is arranged to be uplifted entirely above the height of the line substantially in a vertical direction.

A particular advantage of the solution of the invention is that the passing stage during the start-up of the line previously known to be difficult and laborious can now be performed most advantageously, in other words, it is extremely easy for the operator to guide the sheath paid out from the press to the pulling device after the pulling device has been uplifted from a groove which serves as a cooling device. A further advantage of the invention is that the invention can be extremely advantageously applied so as to enable high rates to be used on the line. A still further advantage of the invention is that the cooling and heating of the sheath can be implemented highly advantageously since the pulling device is placed in a wet space. Another advantage of the invention is that the location of the pulling device can be advantageously changed as required by the process.

Figure 5:
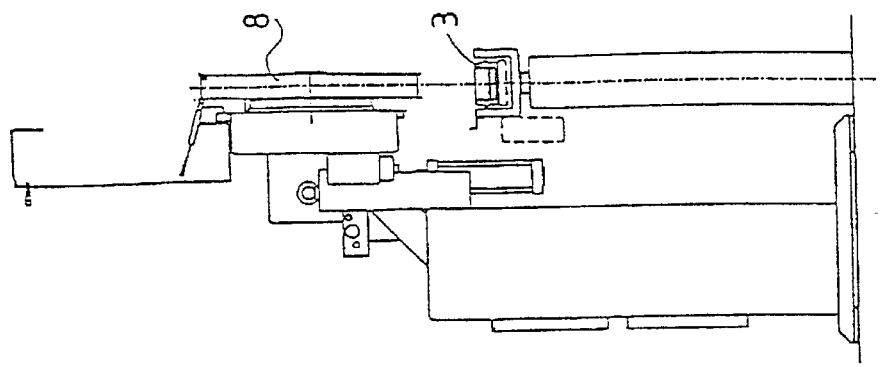
Figure 3:
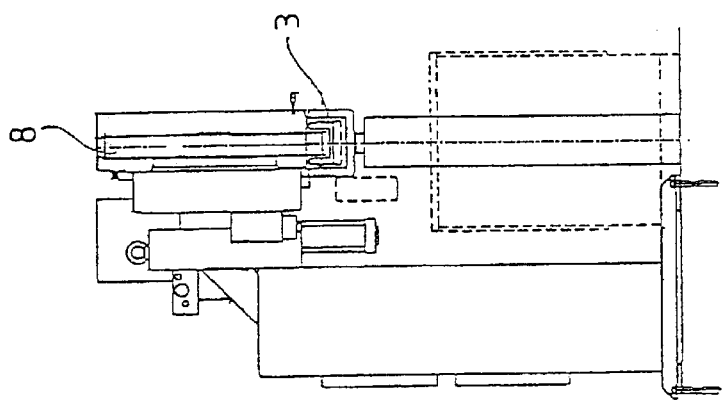
Figure 2:
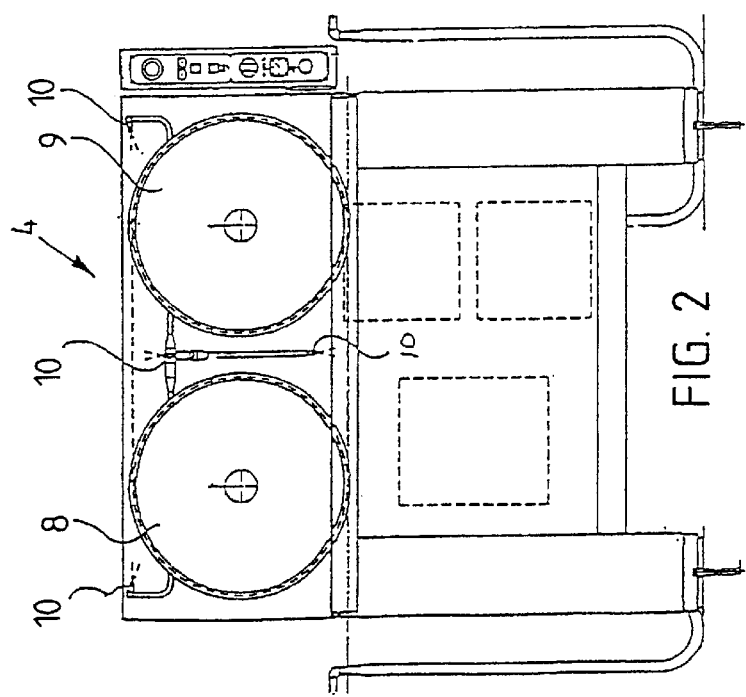
Figure 4:
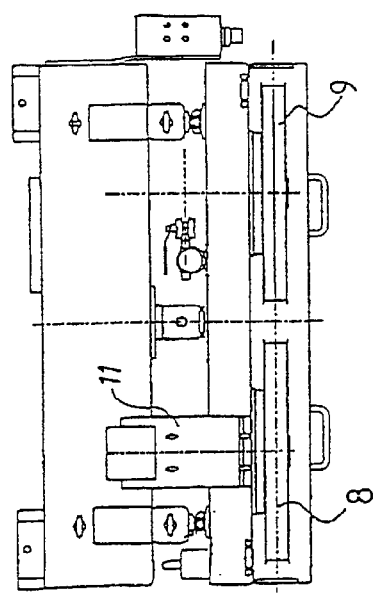

The invention will be described in closer detail in the following by means of a preferred embodiment shown in the accompanying drawing, in which FIG. 1 schematically shows a fibre coating line in connection with an arrangement in accordance with the invention, FIG. 2 is a schematic side view of the arrangement of the invention, FIG. 3 is a view of the arrangement in accordance with FIG. 2 seen in the direction of the line, FIG. 4 is a view of the arrangement in accordance with FIGS. 2 and 3 seen from above, and FIG. 5 is a view of the arrangement in accordance with FIGS. 2, 3 and 4 seen in an uplifted position.

FIG. 1 schematically shows a fibre coating line. Reference number 1 refers to a fibre payout device, and reference number 2 refers to a press by means of which a tube-like sheath made of a plastic material is formed round fibres paid out from the fibre payout device 1. Reference number 3 refers to a cooling means, which can be a cooling groove or a cooling channel, for example. Reference number 4 in FIG. 1 refers to a pulling device, whose operation will be described in closer detail below. Reference number 5 refers to a belt drive device, and reference number 6, in turn, refers to a dancer. Reference number 7 in FIG. 1 refers to a double-take-up-spooler.

The structure and operation of the different components of a fibre coating line are known to those skilled in the art, so these subjects will not be discussed here in closer detail.

FIGS. 2 to 4 schematically show a preferred embodiment of the pulling device 4 used in an arrangement in accordance with the invention. In the embodiment of FIGS. 2 to 4, the pulling device 4 comprises two wheels 8, 9 which are rotationally mounted on horizontal axes and arranged in succession in the direction of movement of the fibres. The pulling device shown in FIGS. 2 to 4 is arranged in the fibre coating line above the height of the line so as to enable, when the line is in operation, the lowest point of the pulling device to be substantially at the height of the line. Such an arrangement is clearly shown in FIG. 3, for instance, which also shows that the lower edge of the wheel 8 is located within a cooling groove 3.

The location of the pulling device on the line is determined on the basis of the dimensions, material, desired line rate and number of fibres of the product to be manufactured.

The basic idea of the invention is that the pulling device 4 is arranged to be uplifted entirely above the height of the line substantially in a vertical direction. This characteristic is extremely advantageous in connection with the start-up of the line, as stated above. The vertical movement of the pulling device is schematically described by means of arrow M in FIG. 1. In this connection, further reference is made to FIGS. 3 and 5, in which case FIG. 3 shows the location of the pulling device when the line is in operation, and FIG. 5 shows the location of the pulling device during the start-up of the line, whereby the operator guides the sheath paid out from the press 2 to the pulling device 4 and further. The distance the pulling device can be uplifted can, of course, be freely chosen as necessary. As an example of the length of the shift can here be given a numerical value 200 mm. It is obvious that the pulling device is returned to the "low" position in accordance with FIG. 3 before the process actually begins.

In the example of the figures, the pulling device is formed by means of two wheels 8, 9 as described above. To form a small angular difference between the wheels 8, 9 is particularly advantageous, in other words to arrange the wheels 8, 9 on levels provided with a small angular difference between them, whereby the product paid out from the press 2 is allowed to travel smoothly and naturally and correctly placed, without any additional controllers.

A further advantage of the arrangement of the invention is that the temperature of the sheath can be kept stable in an extremely advantageous way. This can be implemented by placing sprayers 10 in connection with the pulling device to enable the temperature of the sheath to be lowered or raised if desired by adjusting the temperature of the water to be sprayed. By the two-wheel solution of the invention, an extensive cooling surface for the sheath can be achieved, resulting in optimal cooling temperatures. In this way, it is possible to eliminate the disadvantage of the known solutions owing to a poor and unstable cooling capacity which results in a final product with a poor stability.

In connection with the invention, it has been found advantageous to place a motor 11 in connection with the pulling device so as to enable the pulling to be performed directly from the axis of the motor. An advantage of such a solution is that vibrations caused by power transmission clearances can be advantageously minimized. The solution involves a relatively high-powered motor, for example a 4 kW motor. This, however, causes no substantial drawbacks.

The above example of application is by no means intended to restrict the invention but the invention can be freely modified within the scope of the claims. It is thus obvious that the arrangement of the invention or its details do not necessarily have to be identical to the ones shown in the figures, but various solutions are feasible. The shifting of the pulling device in a vertical direction can be freely implemented in various ways. The pulling device can be arranged for instance to be placed in particular points of the fibre line by producing suitable mounting points in the floor, for example. The vertical movement of the pulling device can be provided in any suitable way, for instance hydraulically, mechanically, etc. The shifting can be performed manually or by means of a suitable power source. Although the invention is described above by means of a pulling device comprising two wheels, it is obvious that the invention is by no means restricted to such an application. The invention can also be applied by means of different pulling devices, for example a one-wheel application is fully feasible if such an arrangement is necessary, etc. The surface of the wheels can be smooth or grooved. The wheels can comprise a wheel deck of several wheels, the wheels of the deck located on the same axis being allowed to rotate with respect to each other. Furthermore, it is to be noted that the invention is by no means restricted to the optic fibre although the invention is described by means of an optic fibre line. Of course, the invention can also be applied to other purposes.

What is claimed is:

1. An arrangement in connection with a coating line, comprising:

a fibre payout device from which fibres are arranged to be guided;

a press for forming a coating around the fibres guided from the fibre payout device;

a cooling device for cooling a conductor formed by the coating and the fibres;

a pulling device that pulls the conductor formed by the coating and the fibres through the press; and means for guiding the conductor to a next processing stage after cooling, wherein the fibres travel along a path or coating line from the fibre payout device through the press and cooling device and wherein a substantial portion of the pulling device is arranged above a height of the coating line so as to enable the lowest point of the pulling device to be substantially at the height of the coating line, and the pulling device is further arranged to be uplifted entirely above the height of the coating line substantially in a vertical direction.

2. An arrangement as claimed in claim 1, wherein the pulling device comprises two wheels which are mounted on horizontal axes and arranged in succession in the direction of movement of the fibres.

3. An arrangement as claimed in claim 2, wherein the wheels of the pulling device are arranged on levels having a small angular difference.

4. An arrangement as claimed in claim 3, wherein a drawing wheel of the pulling device is directly arranged on an axis of a motor which operates as the power source.

5. An arrangement as claimed in claim 3, wherein at least one sprayer is arranged in connection with the pulling device for spraying a cooling and/or heating medium across a surface of the conductor which travels through the pulling device.

6. An arrangement as claimed in claim 2, wherein a drawing wheel of the pulling device is directly arranged on an axis of a motor which operates as the power source.

7. An arrangement as claimed in claim 2, wherein at least one sprayer is arranged in connection with the pulling device for spraying a cooling and/or heating medium across a surface of the conductor which travels through the pulling device.

8. An arrangement as claimed in claim 1, wherein the drawing wheel of the pulling device is directly arranged on an axis of a motor which operates as the power source.

9. An arrangement as claimed in claim 8, wherein at least one sprayer is arranged in connection with the pulling device for spraying a cooling and/or heating medium across a surface of the conductor which travels through the pulling device.

10. An arrangement as claimed in claim 1, wherein at least one sprayer is arranged in connection with the pulling device for spraying a cooling and/or heating medium across a surface of the conduct which travels through the pulling device.

* * * * *